(12) United States Patent
Mitchell

(10) Patent No.: US 6,701,350 B1
(45) Date of Patent: Mar. 2, 2004

(54) SYSTEM AND METHOD FOR WEB PAGE FILTERING

(75) Inventor: Andrew J. Mitchell, Rochester, NY (US)

(73) Assignee: Nortel Networks Limited, Quebec (CA)

(*) Notice: Subject to any disclaimer, the term of this patent is extended or adjusted under 35 U.S.C. 154(b) by 0 days.

(21) Appl. No.: 09/474,125

(22) Filed: Dec. 29, 1999

Related U.S. Application Data

(63) Continuation-in-part of application No. 09/392,367, filed on Sep. 8, 1999, now Pat. No. 6,449,636.

(51) Int. Cl.[7] .............................................. G06F 13/00
(52) U.S. Cl. ........................ 709/217; 705/14; 345/781; 345/866
(58) Field of Search ................................ 709/203, 217, 709/219; 345/797, 744, 835, 810, 764, 781, 866; 705/14

(56) References Cited

U.S. PATENT DOCUMENTS

| | | | | |
|---|---|---|---|---|
| 5,740,549 A | * | 4/1998 | Reilly et al. ................... 705/14 |
| 5,805,442 A | * | 9/1998 | Crater et al. |
| 5,813,007 A | * | 9/1998 | Nielsen ........................ 707/10 |
| 5,832,506 A | * | 11/1998 | Kuzma ........................ 707/200 |
| 5,870,559 A | * | 2/1999 | Leshem et al. |
| 5,889,951 A | * | 3/1999 | Lombardi |
| 5,898,836 A | * | 4/1999 | Freivald et al. ............. 709/218 |
| 5,973,692 A | * | 10/1999 | Knowlton et al. .......... 345/835 |
| 6,012,087 A | * | 1/2000 | Freivald et al. ............. 709/218 |
| 6,057,842 A | * | 5/2000 | Knowlton et al. .......... 345/788 |
| 6,122,657 A | * | 9/2000 | Hoffman et al. ............ 709/201 |
| 6,181,838 B1 | * | 1/2001 | Knowlton .................... 382/305 |
| 6,219,818 B1 | * | 4/2001 | Freivald et al. ............. 714/799 |
| 6,449,636 B1 | * | 9/2002 | Kredo et al. ................ 709/206 |
| 6,609,146 B1 | * | 8/2003 | Slotznick .................... 709/200 |
| 6,615,266 B1 | * | 9/2003 | Hoffman et al. ............ 709/227 |

* cited by examiner

Primary Examiner—Kenneth R. Coulter
(74) Attorney, Agent, or Firm—Hunton & Williams LLP

(57) ABSTRACT

A system and method for Web page display filtering enables a user to selectively filter out sections of Web pages, such as banner ads or inappropriate material. The user may identify a section or a geometric area to be suppressed on subsequent visits. When an item is selected for suppression, a filter script is generated to remove the unwanted Web page area. The filter script is stored and associated with the URL of the Web page. Whenever the Web page associated with the URL is subsequently accessed, the filter script which maps to that URL is applied to the Web page and suppresses the identified section.

20 Claims, 4 Drawing Sheets

SYSTEM AND METHOD FOR WEB PAGE FILTERING

CROSS-REFERENCE TO RELATED APPLICATION

This application is related to, and a continuation-in-part of, application U.S. application Ser. No. 09/392,367, filed Sep. 8, 1999, now U.S. Pat. No. 6,449,636 which is incorporated by reference.

FIELD OF INVENTION

The invention relates generally to Web page filtering, and more particularly to a system and method by which end users may selectively filter out sections of Web pages, such as banner ads and/or other material.

BACKGROUND OF THE INVENTION

A vast amount of information is readily and publicly accessible to users on the Internet, and that collection is growing. Users may access the Internet to retrieve information from a great variety of Web pages, such as news from a news provider, search results from a search engine, product or service information, or other information. As users retrieve a desired Web page, often times other unnecessary information is automatically retrieved and displayed within the borders of that page. Such unwanted information may include advertisements, banners, animated links and other peripheral material. Although many Web site operators rely on the "eyeballs" they attract for advertising returns, the unchecked retrieval of advertisements may slow own the browser and hinder the user's Internet experience. Generally, advertisements are displayed on designated areas of the Web page, such as the top portion or sides of the page. Therefore, it is often easy to predict where advertisements will be positioned with respect to the rest of the Web page content. There may be instances where inappropriate advertisements or other material (e.g., adult themed promotions or unsecured ordering sites) may also be inadvertently retrieved and viewed by an unintended audience, such as young users.

Current browsers offer a limited ability to block the download of all images in a Web page, after which the user must click on each image text tag to display the corresponding portion. It would be desirable to define sections of a Web page where download and display should be avoided, while other portions of the Web page are processed and displayed normally. One application would include blocking ad banners and other unwanted material, while leaving the rest of a Web page intact.

Current browsers thus offer an all or nothing approach to filtering image downloads. It is difficult to define areas of a Web page which should be excluded from display, while all other Web page data is displayed normally. Other filtering tools exist which attempt to specifically filter objects which look like ad banners, based on their text description tag or image size and dimensions. Currently, users do not have the ability to define their own desired filter criteria which can block the download and display of any Web page content (image, text, or other content). Therefore, there is a need for an efficient and effective system and method for selectively filtering out unwanted material on Web pages, including so that the filters associated with the URL are applied each time the Web page is subsequently fetched.

SUMMARY OF THE INVENTION

The invention is directed to a system and method for selectively filtering out sections of a Web Page, such as banner ads or inappropriate material, from being downloaded according to a personalized, specific filter to omit certain text portions or areas of Web pages each time that site is revisited. The user may select one or more sections to be omitted by highlighting one or more items and capturing one or more associated text streams. Alternatively, the user may select the one or more sections to be omitted by drawing one or more boundary boxes around each item to be omitted.

Once the undesired portion is identified by the user, a filter script is automatically generated which removes the undesired Web page section. The filter script may be stored in a local file on the user's machine, or may be located remotely, for instance on an Internet service provider. The filter script may be associated with the URL of the Web page. Whenever the Web page is fetched by the user, any filter script which maps to the URL is automatically executed. Since some Web sites dynamically change a URL via CGI script arguments or load splitting across different servers, the URL associated with a filter script may be a regular expression. Thus, the filter may be applied to any URL which matches a URL pattern string. Actual filtering of the Web pages may be performed by a browser enabled with such abilities, or via a proxy process running on the browser's host.

DETAILED DESCRIPTION OF PREFERRED EMBODIMENTS

The invention provides a system and method for enabling a user to selectively filter unwanted material, for instance by tagging a text portion or by drawing a boundary box around a region to be omitted. When a text portion or area is selected by the user for suppression and the Web page is then called up, a filter script is generated to remove the undesired Web page item. The filter script is stored and associated with the URL of the Web page. Whenever the Web page associated with the URL is subsequently fetched, the filter script which maps to that URL is applied to the Web page and suppresses the corresponding sections. Thus, the user views the Web page with the previously designated sections excluded, such as by an image placeholder symbol or blank zone.

Figure 1:
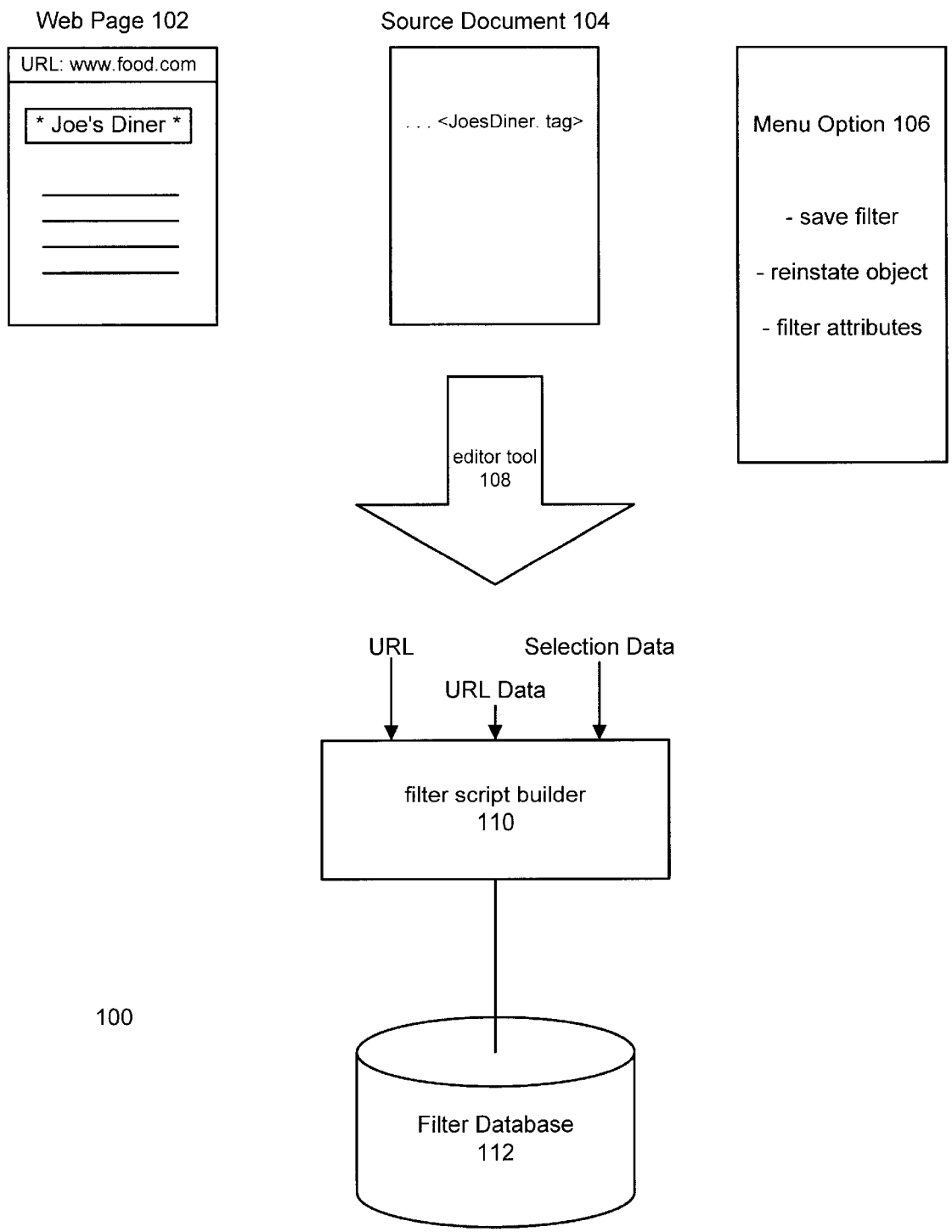
FIG. 1 is a diagram of the generation and storage of filter scripts according to an embodiment of the invention.

FIG. 1 illustrates the generation and storage of filter scripts according to an illustrative embodiment of the invention, as shown by 100. A Web page has a particular address associated with it, called a Uniform Resource Locator ("URL"). When a user enters a URL, a Web page 102 associated with that URL is displayed. Associated with Web page 102 is a source document 104 prepared in a text markup language, such as HTML, XML, Java, Javascript, TCL, Visual Basic, ActiveX, and other programming or markup languages usable within or in conjunction with Web browsers. The invention may create a list of HTML tags reflecting content to be excluded through the use of an editor tool.

The user may activate a menu option 106 by various activation techniques, such as right clicking on a mouse. The user may have the option of saving a filter, reinstating an object, designating filter attributes, and other options related to the filtering process. If the user selects the option to save a filter, the user may selectively filter out a particular portion of the Web page. The user may select the unwanted portion of the Web page through different definition techniques, such as a highlight option or a geometric area option.

If the user chooses to highlight specific sections, the user may highlight a portion of the page to be omitted through editor tool 108 by selecting a section to be omitted. For example, the user may right click on or otherwise highlight an advertising banner. A filter script associated with the highlighted section may then be generated. For example, if a user wants to suppress all advertisements from Joe's Diner, the user may right click on the advertisement to activate a filter script program according to the present invention. Editor tool 130 then records HTML or other information related to the generation of that section, such as JoesDiner.tag.

Actual filtering of the Web pages may be performed by a browser enabled with filtering abilities or via a gateway process running on the browsers' host. For example, the gateway may sit in the Internet data stream as a pipeline process, scanning all pages going by, applying any selected filters before the Web page is passed to the browser. According to one embodiment of the invention, the gateway filter process may generically scan page content for certain HTML expressions encoding a banner advertisement or other section, and block the expression of that content from being sent to the browser. The filter script may be configured to trigger on whole or partial expressions as well. For instance, a parent may define a generic keyword, such as "sex", for example. All HTML expressions containing that term as part of their HTML encoding are blocked, and unable to be viewed by young children.

In another embodiment, a stream editor ("SED") function provided under the Unix operating system may be implemented to scan all pages and locate patterns in a text stream coming in through a Web browser. Thus as described, editor tool 108 may conduct surveillance on Web pages for the tagged filter script, JoesDiner.tag. When the filter script JoesDiner.tag is located by the editor tool 108, the associated expression is suppressed before the Web page is generated and displayed by the browser. This method targets specific text located on a Web page. Alternatively, in another embodiment, a Java Applet may be activated to locate the presence of unwanted content according to filter scripts.

The editor tool 108 maintains a list of URLs associated with each selection area that is assigned a filter script. When the URL is subsequently retrieved, a filter script associated with the URL is applied so any identified section is not displayed on the Web page.

If the user selects the geometric area option, the user may select a boundary box using any method to outline a geometric area where all enclosed objects are to be filtered out from future display. For example, the user may use a mouse to select the area to be omitted by clicking and dragging the mouse to develop a square or rectangular shape around a desired suppression area. Alternatively, the user may enter actual pixel locations or other user inputs for selecting a particular geometric area on a screen. Advertisements are generally displayed on the top area and the side areas of a Web page. Thus, in one example, the user may select the top area of the Web page where banner ads are generally located for suppression of any anticipated advertisements.

Once identified or selected, a filter script builder 110 builds a filter script which removes the selected one or more sections from future expressions of the Web page associated with the URL data. The filter is indexed by the URL string and stored in filter database 112.

Figure 2:
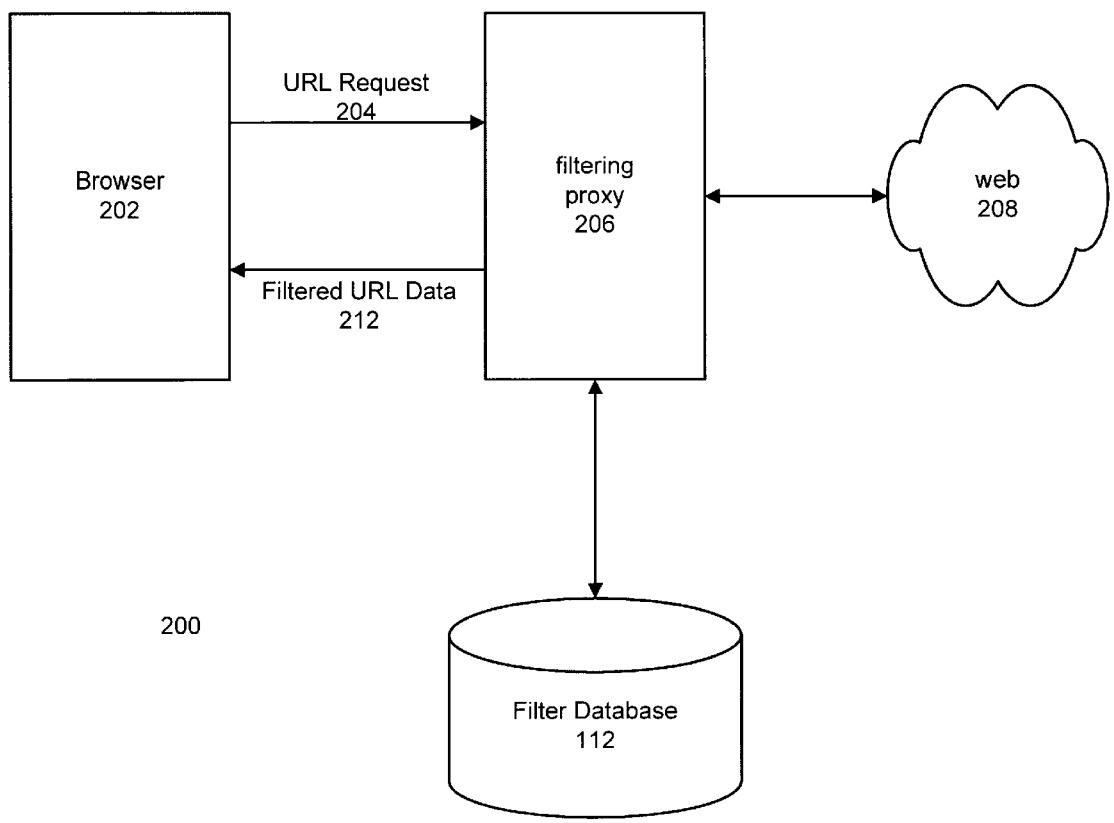
FIG. 2 is a diagram illustrating retrieval of a Web page where the unwanted sections have been filtered according to the present invention.

FIG. 2 is a diagram illustrating the retrieval of a Web page where the unwanted sections have been filtered, as shown by 200. A user may submit a URL request 204 through browser 202. Filtering proxy 206 may be situated in a network data stream, between browser 202 and Web 208. Filtering proxy 206 may be situated in a user's local computer, or alternatively, it may be located in a remote location, such as on an Internet service provider. As a collective resource, users may access filtering proxy 206 upon logging on a designated Web site. When browser 202 submits a URL request 204, the associated Web page is fetched and any filter scripts in the filter database 112 that match the URL are applied to the Web page to generate filtered URL data 212. Filtered URL data 212 is then displayed to the user. Thus, the user views the Web page without the unwanted objects because objects which were selected during filter composition are located and deleted from the URL data. To maintain the page layout structure, a blank box may be inserted for the omitted display.

In another embodiment of the invention, filters stored in filter database 112 may be exportable and shared with other users. For example, one user who has developed a database of filters may send this set of filter triggers to a second user so that the second user may add the filter triggers to the second user's personal list.

In another embodiment of the invention, a user may designate particular attributes which will trigger the filter. For example, the user may specify whether filters associated with a particular URL are to be applied to exact matches of the URL, or other related URLs. For example, a filter URL of "http://www.hello.com/index.html" may be designated to apply to only exact matches. In this example, a filter is applied to detect URL "http://www.hello.com/index.html" (i.e., an exact match), but not to "http://www.hello.com/users/foo.html". In another example, the user may prefer a filter to be applied to one or more related URLs. For example, a filter URL of "http://www.hello.com/*" may apply to related URLs where such matches may include "http://www.hello.com/index.html", "http://www.hello.com/users/agm/index.html", and other URLs that begin with "http://www.hello.com/".

Figure 3:
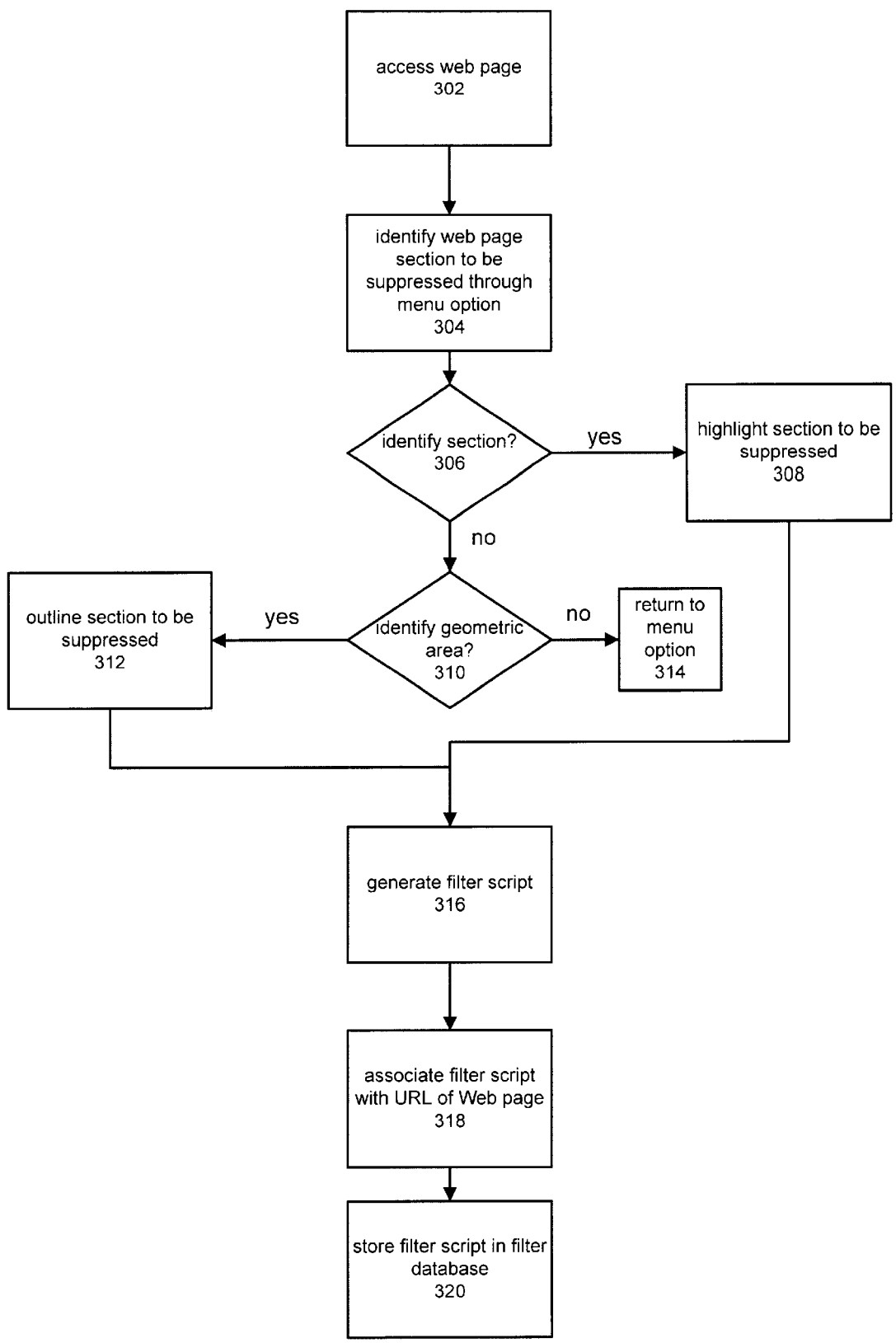
FIG. 3 illustrates a flow diagram of the generation and storage of filter scripts according to the present invention.

FIG. 3 illustrates a flow diagram of the generation and storage of filter scripts according to an embodiment of the invention. At step 302, a user may access a Web page. If the user desires to suppress unwanted material, such as advertisements or inappropriate material, the user may identify one or more Web page items to be suppressed through a menu option, at step 304. At step 306, the user may decide to identify text to be suppressed on subsequent visits. At this point, the user may click on or otherwise select the unwanted section at step 308. If the user prefers to suppress an enclosed geometric area, at step 310, the user may outline an area where items within the enclosed area are to be suppressed, at step 312. If the user selects neither selection option, he or she may return to menu option, at step 314. Upon selecting an item to be suppressed, the filter script builder 110 generates a filter script associated with the unwanted item, at step 316. The URL of the Web page is then associated with the filter script, at step 318. The filter script along with the associated URL are stored in the filter database 112, at step 320.

Figure 4:
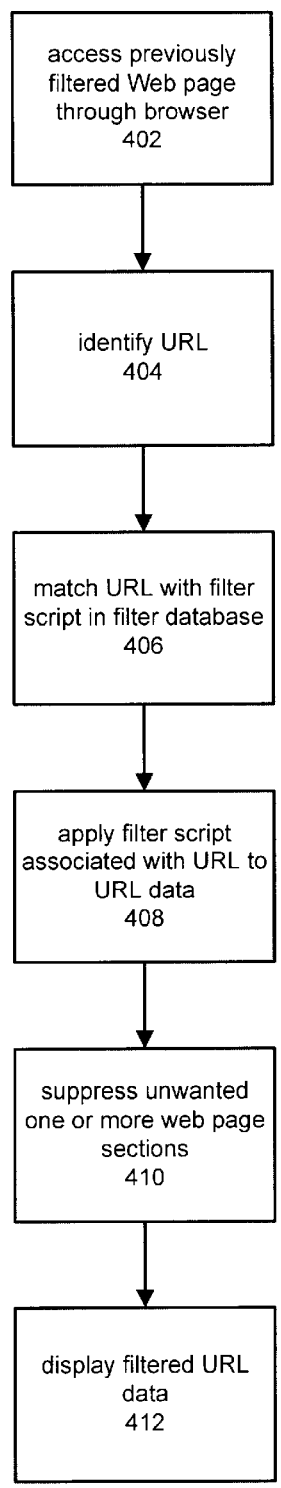
FIG. 4 illustrates a flow diagram of retrieval of a filtered Web page according to the present invention.

FIG. 4 illustrates a flow diagram of retrieval of a filtered Web page according to the invention. At step 402, a user may access a previously filtered Web page through a browser by submitting a URL request. A filtering proxy identifies the URL, at step 404. The identified URL is then matched with one or more filter scripts stored in filter database 112, at step 406. The filtering proxy then applies the filter script associated with the URL to URL data, at step 408. The filtering proxy suppresses the unwanted items from the Web page, at step 410. The filtered URL data is displayed to the user where items identified by filter scripts are suppressed, at step 412.

Other embodiments and uses of the invention will be apparent to those skilled in the art from consideration of the specification and practice of the invention disclosed herein. The scope of the invention is accordingly intended to be limited only by the following claims.

What is claimed is:

1. A method for generating a filter for selectively filtering out sections of a Web page comprising the steps of:
   a) selecting a section of a Web page to be suppressed each time the Web page is retrieved;
   b) generating a filter script associated with the selected section;
   c) assigning a URL string to the filter script; and
   d) storing the filter script and the URL string in a filter database.

2. The method of claim 1, wherein the step (a) of selecting comprises clicking on the selected section with a mouse.

3. The method of claim 1, wherein the step (a) of selecting comprises selecting a geometric area where the enclosed area is suppressed.

4. The method of claim 1, further comprising a step of e) reinstating a previously filtered item.

5. The method of claim 1, further comprising a step of designating at least one filter attribute.

6. The method of claim 5, wherein the at least one filter attribute comprises specifying the application of the filter script to other URLs that match the URL string associated with the filter script.

7. The method of claim 1, wherein the step (b) of generating a filter script comprises a step of (f) storing HTML encoded tag information associated with the selected section.

8. A method for displaying a filtered Web page, comprising the steps of:
   a) submitting a URL request associated with a Web page through a browser;
   b) identifying the URL and matching the URL with at least one filter script stored in a filter database;
   c) applying at least one filter script associated with the URL to suppress at least one preselected display area; and
   d) displaying filtered URL data to the user.

9. The method of claim 8, wherein the at least one filter script is located on the user's computer.

10. The method of claim 8, wherein the at least one filter script is located in a remote location.

11. A system for generating a filter script for suppressing unwanted items on a Web page, comprising:
    a selection option for enabling a user to select a section of a Web page to be suppressed each time the Web page is retrieved;
    a filter script builder for generating a filter script associated with the selected section to suppress the selected item on the Web page, wherein a URL string is assigned to the filter script; and
    a filter database for storing the filter script and the URL string.

12. The system of claim 11, wherein the user selects the section to be suppressed by clicking on the selected section with a mouse.

13. The system of claim 11, wherein the user selects the section by defining a geometric area where the enclosed area is suppressed.

14. The system of claim 11, wherein the user reinstates a previously filtered section.

15. The system of claim 11, wherein the user designates at least one filter attribute.

16. The system of claim 15, wherein the at least one filter attribute comprises specifying the application of the filter script to other URLs that match the URL string.

17. The system of claim 11, wherein the at least one filter script stores HTML encoded tag information associated with the selected section.

18. A system for displaying a filtered Web page, comprising:
    a browser for submitting a URL request associated with a Web page;
    a filtering proxy for identifying the URL and matching the URL with at least one filter script stored in a filter database; and
    a display for displaying filtered URL data to the user wherein at least one section identified by the at least one filter script is suppressed.

19. The system of claim 18, wherein the filter proxy is located on the user's computer.

20. The system of claim 18, wherein the filter proxy is located in a remote location.

* * * * *